(12) United States Patent
Chen

(10) Patent No.: US 8,250,223 B2
(45) Date of Patent: Aug. 21, 2012

(54) PORTABLE ELECTRONIC DEVICE AND METHOD FOR DOWNLOADING A FIRMWARE LOADER FROM A HOST COMPUTER

(75) Inventor: Chi-Hsien Chen, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 372 days.

(21) Appl. No.: 12/614,568

(22) Filed: Nov. 9, 2009

(65) Prior Publication Data

US 2010/0241752 A1 Sep. 23, 2010

(30) Foreign Application Priority Data

Mar. 17, 2009 (CN) .......................... 2009 1 0300916

(51) Int. Cl.
G06F 15/16 (2006.01)
G08C 25/02 (2006.01)
G06F 9/44 (2006.01)

(52) U.S. Cl. .................. 709/228; 714/748; 717/172

(58) Field of Classification Search .......... 709/217–219, 709/227–237; 717/171–173; 714/748
See application file for complete search history.

(56) References Cited

U.S. PATENT DOCUMENTS

| | | | | |
|---|---|---|---|---|
| 6,308,061 | B1* | 10/2001 | Criss et al. | 455/418 |
| 6,978,453 | B2* | 12/2005 | Rao et al. | 717/171 |
| 7,480,907 | B1* | 1/2009 | Marolia et al. | 717/174 |
| 7,644,406 | B2* | 1/2010 | Gustafson et al. | 717/172 |
| 7,716,414 | B2* | 5/2010 | Slyz et al. | 711/103 |
| 7,739,486 | B2* | 6/2010 | Rao | 713/1 |
| 7,752,616 | B2* | 7/2010 | Marolia et al. | 717/169 |
| 7,904,895 | B1* | 3/2011 | Cassapakis et al. | 717/168 |
| 2003/0182414 | A1* | 9/2003 | O'Neill | 709/223 |
| 2004/0083472 | A1* | 4/2004 | Rao et al. | 717/171 |
| 2004/0093597 | A1* | 5/2004 | Rao et al. | 717/171 |
| 2004/0103412 | A1* | 5/2004 | Rao et al. | 717/171 |
| 2004/0107417 | A1* | 6/2004 | Chia et al. | 717/171 |
| 2004/0177353 | A1* | 9/2004 | Rao | 717/171 |
| 2004/0194081 | A1* | 9/2004 | Qumei et al. | 717/173 |
| 2004/0230965 | A1* | 11/2004 | Okkonen | 717/168 |
| 2006/0106806 | A1* | 5/2006 | Sperling et al. | 707/10 |
| 2007/0277169 | A1* | 11/2007 | Rao et al. | 717/173 |
| 2008/0098160 | A1* | 4/2008 | Slyz et al. | 711/103 |
| 2008/0168435 | A1* | 7/2008 | Tupman et al. | 717/173 |
| 2009/0217256 | A1* | 8/2009 | Kim | 717/168 |
| 2010/0131084 | A1* | 5/2010 | Van Camp | 700/86 |

OTHER PUBLICATIONS

Suvak, "Session Capabilities in OBEX," 2002.*

* cited by examiner

*Primary Examiner* — Dohm Chankong
*Assistant Examiner* — Julian Chang
(74) *Attorney, Agent, or Firm* — Altis Law Group, Inc.

(57) ABSTRACT

A method for downloading a firmware loader from a host computer to a portable electronic device establishes a communication connection between the host computer and the portable electronic device. Transmission parameters between the portable electronic device and the portable electronic device are configured. The firmware loader is transmitted from the host computer to the portable electronic device according to the transmission parameters. The firmware loader is verified, where the portable electronic device obtains a start address of the firmware loader.

10 Claims, 3 Drawing Sheets

PORTABLE ELECTRONIC DEVICE AND METHOD FOR DOWNLOADING A FIRMWARE LOADER FROM A HOST COMPUTER

BACKGROUND

1. Technical Field

Embodiments of the present disclosure relate to an electronic device and data transmission method, and particularly to a portable electronic device and method for downloading a firmware loader from a host computer.

2. Description of Related Art

Portable electronic devices, such as mobile phones, include a firmware loader to load a firmware into the devices. The firmware performs various initialization functions and initiate loading and execution of other software, such as operating system software. The portable electronic devices are usually equipped with some specific hardware to download the firmware loader from a host computer. The use of the specific hardware will increase the cost and the size of a portable electronic device.

DETAILED DESCRIPTION

All of the processes described below may be embodied in, and fully automated via, functional code modules executed by one or more general purpose processors of a portable electronic device. The code modules may be stored in any type of storage medium. Some or all of the methods may alternatively be embodied in specialized hardware.

Figure 1:
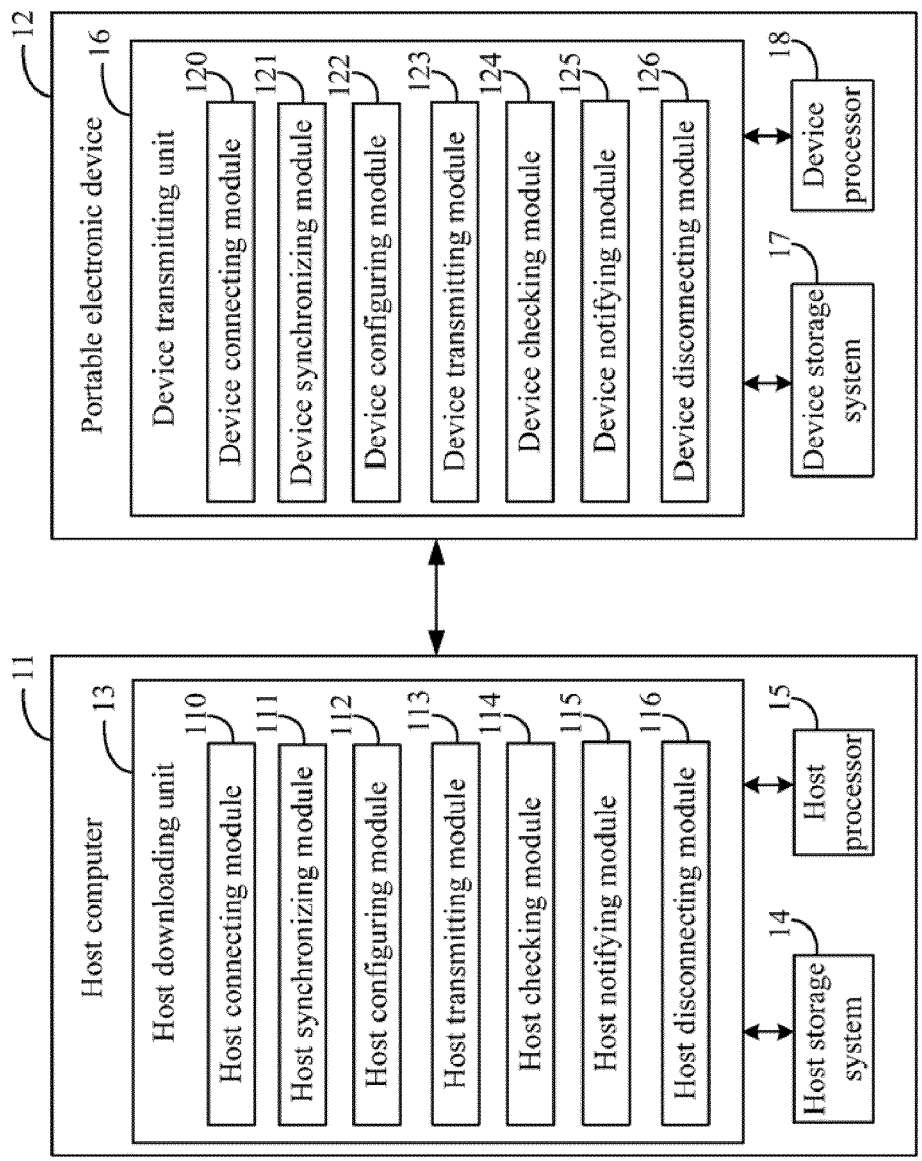
FIG. 1 is a block diagram of one embodiment of a portable electronic device that downloads a firmware loader from a host computer.

FIG. 1 is a block diagram of one embodiment of a portable electronic device 12 that downloads a firmware loader from a host computer 11. It may be understood that the firmware loader is used to load a firmware from the host computer 11 into the portable electronic device 12. The firmware may perform various initialization functions and initiate loading and execution of other software, such as operating system software.

In one embodiment, the portable electronic device 12 may be connected to the host computer 11 via an input/output (I/O) interface, such as a universal serial bus (USB) or a universal asynchronous receiver/transmitter (UART), for example. The portable electronic device 12 may be an embedded device, such as a mobile phone, a personal digital assistant (PDA), or a digital camera.

The host computer 11 may include a host transmitting unit 13, a host storage system 14, and a host processor 15. One or more computerized codes of the host transmitting unit 13 are stored in the host storage system 14 and executed by the host processor 15. The portable electronic device 12 may include a device downloading unit 16, a device storage system 17, and a device processor 18. One or more computerized codes of the device downloading unit 16 are stored in the device storage system 17 and executed by the device processor 18. The device storage system 17 may include an internal memory and an external memory. The external memory may include a smart media card (SMC), a secure digital card (SDC), a compact flash card (CFC), a multimedia card (MMC), a memory stick (MS), an extreme digital card (XDC), and a trans flash card (TFC). The external memory may be a read only memory (ROM), a flash memory, or an erasable programmable read-only memory (EPROM), for example.

In one embodiment, the host transmitting unit 13 may include a host connecting module 110, a host synchronizing module 111, a host configuring module 112, a host transmitting module 113, a host checking module 114, a host notifying module 115, and a host disconnecting module 116. The device downloading unit 16 may include a device connecting module 120, a device synchronizing module 121, a device configuring module 122, a device transmitting module 123, a device checking module 124, a device notifying module 125, and a device disconnecting module 126.

The host connecting module 110 and the device connecting module 120 are operable to establish a communication connection between the host computer 11 and the portable electronic device 12. The communication connection may use the input/output (I/O) interface, as mentioned above.

The host synchronizing module 111 and the device synchronizing module 121 communicates to verify that the portable electronic device 12 is ready to receive the firmware loader.

The host configuring module 112 and the device configuring module 122 are operable to configure transmission parameters that are required for transmitting the firmware loader.

The host transmitting module 113 and the device transmitting module 123 are operable to transmit the firmware loader from the host computer 11 to the portable electronic device 12. In one embodiment, the host transmitting module 113 may specify memory addresses in the device storage system 17 while transmitting the firmware loader, and the host transmitting module 123 may store the received firmware loader to the memory addresses.

The host checking module 114 and the device checking module 124 are operable to verify the firmware loader received by the portable electronic device 12. In one embodiment, the verifying process is done by applying a checksum.

The host notifying module 115 is operable to inform the portable electronic device 12 of a start address of the firmware loader in the device storage system 17, so as to enable the portable electronic device 12 to execute the firmware loader at the start address.

The host disconnecting module 116 and the device disconnecting module 126 are operable to terminate the communication connection between the host computer 11 and the portable electronic device 12.

Figure 2:
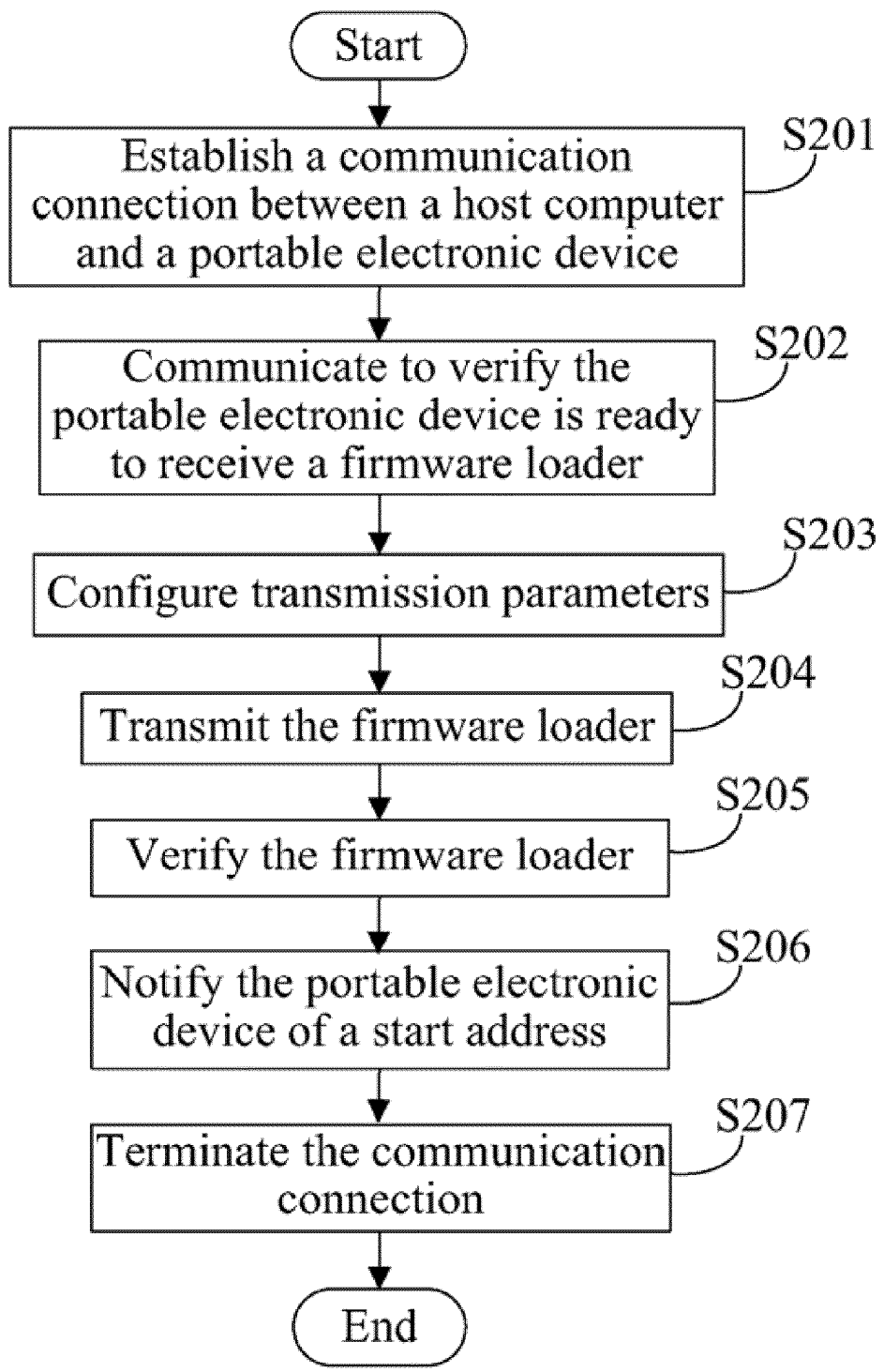
FIG. 2 is a flowchart of one embodiment of a method for downloading a firmware loader from a host computer to a portable electronic device.
Figure 3:
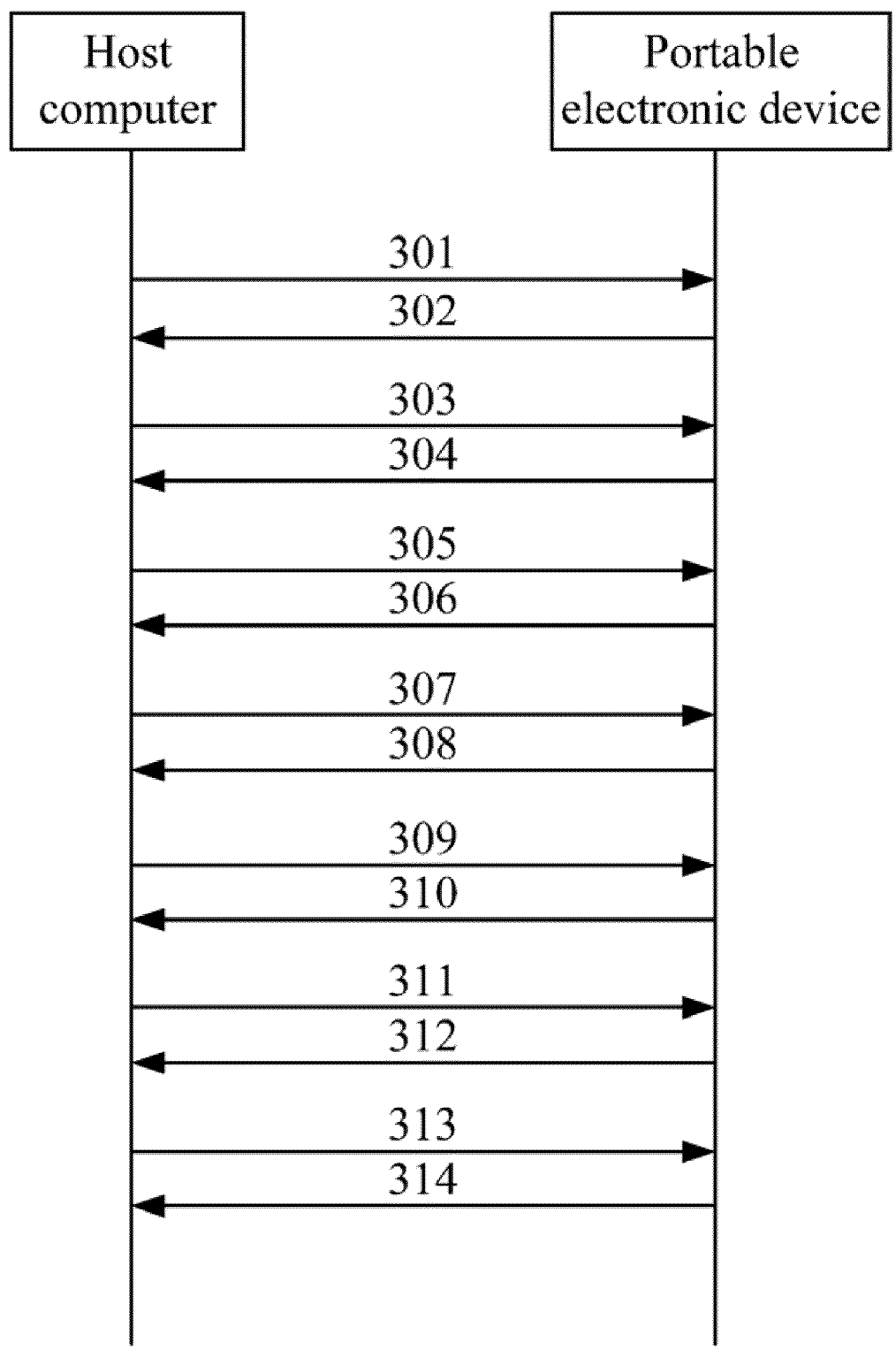
FIG. 3 is a data flow diagram of the operation of the process shown in FIG. 2.

FIG. 2 is a flowchart of one embodiment of a method for downloading a firmware loader from the host computer 11 to the portable electronic device 12. The method of FIG. 2 is illustrated in junction with FIG. 3, which is a data flow diagram of the operation of the process shown in FIG. 2. Depending on the embodiments, additional blocks may be added, others removed, and the ordering of the blocks may be changed.

In block S201, the host connecting module 110 and the device connecting module 120 establish a communication connection between the host computer 11 and the portable electronic device 12. In one embodiment, the host connecting module 110 sends a connection request 301 to the portable electronic device 12. The device connecting module 120 sends back a connection response 302 to the host computer 11. As such, the communication connection is established.

In block S202, the host synchronizing module 111 and the device synchronizing module 121 communicate to verify that the portable electronic device 12 is ready to receive the firmware loader. In one embodiment, the host synchronizing module 111 sends a synchronization request 303 to the portable electronic device 12. The device synchronizing module 121 sends back a synchronization response 304 to the host computer 11. The synchronization response 304 indicates that the portable electronic device is ready to receive the firmware loader.

In block S203, the host configuring module 112 and the device configuring module 122 configure transmission parameters that are required for transmitting the firmware loader. In one embodiment, the host configuring module 112 sends at least one parameter configuration request 305 to the portable electronic device 12. The device configuring module 122 sends back a parameter configuration response 306 to the host computer 11 in response to each parameter configuration request 305. For example, the host configuring module 112 sends the parameter configuration request 305 to inquire about the transmission parameters. The device configuring module 122 sends back the parameter configuration response 306 to reply the transmission parameters.

The transmission parameters may include a connection mode, a data transmission rate, a data acknowledgement parameter, and a maximum data size. The firmware loader may be divided into a plurality of data blocks to transmit. The maximum data size indicates a maximum size of the data blocks, such as 64 bytes. The connection mode includes a USB mode, a UART mode, and a Bluetooth mode. The data acknowledgement parameter determines if the portable electronic device 12 is required to acknowledge a reception of the firmware loader. In one example, the portable electronic device 12 may acknowledge each reception of a data block if the data acknowledge is enabled. The transmission parameters may further include a waiting time. The host computer 11 may resend a data block if a corresponding acknowledgement has not received from the portable electronic device 12 within the waiting time.

In block S204, the host transmitting module 113 and the device transmitting module 123 transmits the firmware loader from the host computer 11 to the portable electronic device 12. In one embodiment, the host transmitting module 113 sends at least one data transmission request 307 to the portable electronic device 12. Each data transmission request 307 includes a data block of the firmware loader and a memory address in the device storage system 17. The device transmitting module 123 retrieves the data block from the data transmission request 307, and stores the data block to the memory address in the device storage system 17. The device transmitting module 123 may send back a data transmission response 308 to the portable electronic device 12 if the data acknowledgement is enabled. The data transmission request 307 may further include a checksum for each data block. The device transmitting module 123 may verify the received data block according to the checksum. The host transmitting module 113 may resend the data block if the data block is verified to be incorrect.

In block S205, the host checking module 114 and the device checking module 124 verify the firmware loader received by the portable electronic device 12. In one embodiment, the host checking module 114 sends a check request 309 to the portable electronic device 12. The check request 309 comprises a total checksum. The checking module 124 checks if the firmware loader received from the host computer 11 is correct according to the check information, and sends back a check response 310 to the host computer 11. The process may return to block S204 if the received firmware loader is incorrect.

In block S206, the host notifying module 115 notifies the portable electronic device 12 of a start address of the firmware loader in the device storage system 17. The portable electronic device 12 may execute the firmware loader at the start address. In one embodiment, the host notifying module 115 sends a notification request 311 to the portable electronic device 12. The host notifying module 115 checks if the start address is correct and sends back a notification response 312. The host notifying module 115 may resend the notification request 312 that contains a new start address if the start address is incorrect.

In block S207, the host disconnecting module 116 and the device disconnecting module 126 terminate the communication connection between the host computer 11 and the portable electronic device 12. In one embodiment, the host disconnecting module 116 sends a disconnection request 313 to the portable electronic device 12. The disconnecting module 126 sends back a disconnection response 314 to the host computer 11. As such, the communication connection is terminated.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A portable electronic device, comprising:
   a storage system;
   at least one processor; and
   a device downloading unit stored in the storage system and executable by the at least one processor, the device downloading unit comprising:
   a device connecting module operable to establish a communication connection between a host computer and the portable device over an input/output (I/O) interface;
   a device synchronizing module operable to communicate with the host computer to verify that the portable electronic device is ready to receive a firmware loader;
   a device configuring module operable to configure a plurality of transmission parameters between the portable electronic device and the host computer, wherein the transmission parameters comprise a connection mode, a data transmission rate, a waiting time, and a data acknowledgement parameter that determines if the portable electronic device is required to acknowledge a reception of the firmware loader;
   a device transmitting module operable to receive the firmware loader from the host computer according to the transmission parameters, acknowledge the reception of the firmware loader upon condition that the data acknowledge is enabled, and store the firmware loader into the storage system, wherein the host computer resends the firmware loader upon condition that an acknowledgement of the reception of the firmware loader has not been received from the portable electronic device within the waiting time;
   a device checking module operable to verify the received firmware loader;
   a device notifying module operable to obtain a start address of the firmware loader in the portable electronic device from the host computer; and
   a device disconnecting module operable to terminate the communication connection with the host computer.

2. The portable electronic device of claim 1, wherein the storage system is selected from the group consisting of a smart media card (SMC), a secure digital card (SDC), a compact flash card (CFC), a multimedia card (MMC), a memory stick (MS), an extreme digital card (XDC), and a trans flash card (TFC).

3. The portable electronic device of claim 1, wherein the firmware loader is divided into a plurality of data blocks to transmit.

4. The portable electronic device of claim 3, wherein each of the data blocks is transmitted to the portable electronic device along with a checksum.

5. A method for downloading a firmware loader from a host computer to a portable electronic device, the method comprising:

establishing a communication connection between the host computer and the portable electronic device over an input/output (I/O) interface;

communicating between the host computer and the portable electronic device to verify that the portable electronic device is ready to receive the firmware loader;

configuring transmission parameters between the portable electronic device and the host computer, wherein the transmission parameters comprise a connection mode, a data transmission rate, a waiting time, and a data acknowledgement parameter that determines if the portable electronic device is required to acknowledge a reception of the firmware loader;

transmitting the firmware loader from the host computer to the according to the transmission parameters, wherein the portable electronic device acknowledges the reception of the firmware loader upon condition that the data acknowledge is enabled, and the host computer resends the firmware loader upon condition that an acknowledgement of the reception of the firmware loader has not been received from the portable electronic device within the waiting time;

verifying the firmware loader received by the portable electronic device;

notifying the portable electronic device of a start address of the firmware loader in the portable electronic device; and terminating the communication connection between the host computer and the portable electronic device.

6. The method of claim 5, wherein the firmware loader is divided into a plurality of data blocks to transmit.

7. The method of claim 6, wherein each of the data blocks is transmitted to the portable electronic device along with a checksum.

8. A non-transitory computer-readable storage medium having stored thereon instructions that, when executed by a portable electronic device, cause the portable electronic device to execute a method for downloading a firmware loader from a host computer to a portable electronic device, the method comprising:

establishing a communication connection between the host computer and the portable electronic device over an input/output (I/O) interface;

communicating between the host computer and the portable electronic device to verify that the portable electronic device is ready to receive the firmware loader;

configuring transmission parameters between the portable electronic device and the host computer, wherein the transmission parameters comprise a connection mode, a data transmission rate, a waiting time, and a data acknowledgement parameter that determines if the portable electronic device is required to acknowledge a reception of the firmware loader;

transmitting the firmware loader from the host computer to the portable electronic device according to the transmission parameters, wherein the portable electronic device acknowledges the reception of the firmware loader upon condition that the data acknowledge is enabled, and the host computer resends the firmware loader upon condition that an acknowledgement of the reception of the firmware loader has not been received from the portable electronic device within the waiting time;

verifying the firmware loader received by the portable electronic device;

notifying the portable electronic device of a start address of the firmware loader in the portable electronic device; and terminating the communication connection between the host computer and the portable electronic device.

9. The storage medium of claim 8, wherein the firmware loader is divided into a plurality of data blocks to transmit.

10. The storage medium of claim 9, wherein each of the data blocks is transmitted to the portable electronic device along with a checksum.

* * * * *